United States Patent [19]
Danielsson et al.

[11] Patent Number: 5,894,761
[45] Date of Patent: Apr. 20, 1999

[54] INDUSTRIAL ROBOT WRIST UNIT

[75] Inventors: Stefan Danielsson; Jan Gepertz; Jan Larsson, all of Västerås, Sweden

[73] Assignee: Asea Brown Boveri AB, Vasteras, Sweden

[21] Appl. No.: 08/875,213

[22] PCT Filed: Jan. 26, 1996

[86] PCT No.: PCT/SE96/00086

§ 371 Date: Jul. 24, 1997

§ 102(e) Date: Jul. 24, 1997

[87] PCT Pub. No.: WO96/22861

PCT Pub. Date: Aug. 1, 1996

[30] Foreign Application Priority Data

Jan. 27, 1995 [SE] Sweden .................... 9500296

[51] Int. Cl.$^6$ .................... B25J 17/02; F16H 57/02
[52] U.S. Cl. .................... 74/490.06; 74/606 R; 901/26; 901/29
[58] Field of Search .................... 74/490.06, 606 R; 901/26, 29

[56] References Cited

U.S. PATENT DOCUMENTS

| | | | |
|---|---|---|---|
| 4,807,486 | 2/1989 | Akeel et al. | 901/29 X |
| 4,823,279 | 4/1989 | Perzley et al. | 901/29 X |
| 4,922,755 | 5/1990 | Oshiro et al. | 901/29 X |
| 4,972,735 | 11/1990 | Torii et al. | 901/29 X |
| 5,119,687 | 6/1992 | Naruoka et al. | 901/25 X |

FOREIGN PATENT DOCUMENTS

| | | |
|---|---|---|
| 3736355 | 5/1988 | Germany . |
| 53-78554 | 12/1978 | Japan . |

*Primary Examiner*—Allan D. Herrman
*Attorney, Agent, or Firm*—Watson Cole Grindle Watson, P.L.L.C.

[57] ABSTRACT

An industrial robot wrist unit comprising a wrist housing capable of being detachably mounted to the distal end of a robot arm, the housing having two fork arms supporting a pivotally mounted tilt housing which supports a rotatably mounted turntable on which an external implement can be mounted. The tilt housing is positively confined between the fork arms so that reactive forces stemming from the gearings in the housing are prevented from forcing the fork arms apart.

5 Claims, 1 Drawing Sheet

1

INDUSTRIAL ROBOT WRIST UNIT

BACKGROUND OF THE INVENTION

The present invention relates to an industrial robot wrist unit, comprising a wrist housing, which is intended to be fixed on a distal end of a robot arm and which has two fork arms between which a tilt housing is pivotally mounted, the tilt housing supporting in turn a rotatably mounted turntable, on which there can be mounted a distal implement, in the wrist housing there being rotatably mounted first and second drive shafts, the first drive shaft, via a first and a second gearing, being able to rotate the turntable about a first axis and said second drive shaft, via a third gearing being capable of pivoting the tilt housing about a second axis which crosses the first axis.

In previously known wrist units of the above mentioned type, the gearings have been mounted in the wrist housing so that reactive forces arising in the gearings during certain operating conditions have been able to force the fork arms apart in an undesirable manner to the detriment of the precision in positioning the tool mounted on the turntable. This can be avoided by increasing the dimensions of the wrist housing, which has, however, caused an undesirable increase in weight in the entire wrist housing.

SUMMARY OF THE INVENTION

A primary objective of the present invention is therefore to propose a wrist unit which avoids this disadvantage. For this purpose, the wrist unit described by way of introduction is characterized according to the invention in that the tilt housing is positively confined between the fork arms so that reactive forces stemming from the first, second and third gearings are prevented from pushing apart the fork arms.

Additional purposes of the present invention are for example to achieve a wrist unit of the type in question which has a wrist housing which is compact, is easier to manufacture and permits installation of gear trains and tilt housing with high precision and with fewer tolerance problems. The wrist housing has a small number of sealing surfaces and thus less tendency to leak and it makes it possible to mount the tilt housing in both fork arms.

These and other purposes are achieved in a wrist unit according to the invention which has the characterizing features disclosed in the attached dependent claims.

BRIEF DESCRIPTION OF THIS DRAWINGS

The invention will be described in more detail below with reference to the accompanying drawing, in which:

FIG. 1 is a partially sectioned longitudinal view of a wrist unit in accordance with the invention mounted on a distal end of a robot arm; and FIG. 2 is an end view of the wrist unit shown in FIG. 1 as seen from the end of the robot arm.

DETAILED DESCRIPTION OF THE INVENTION

Figure 1:
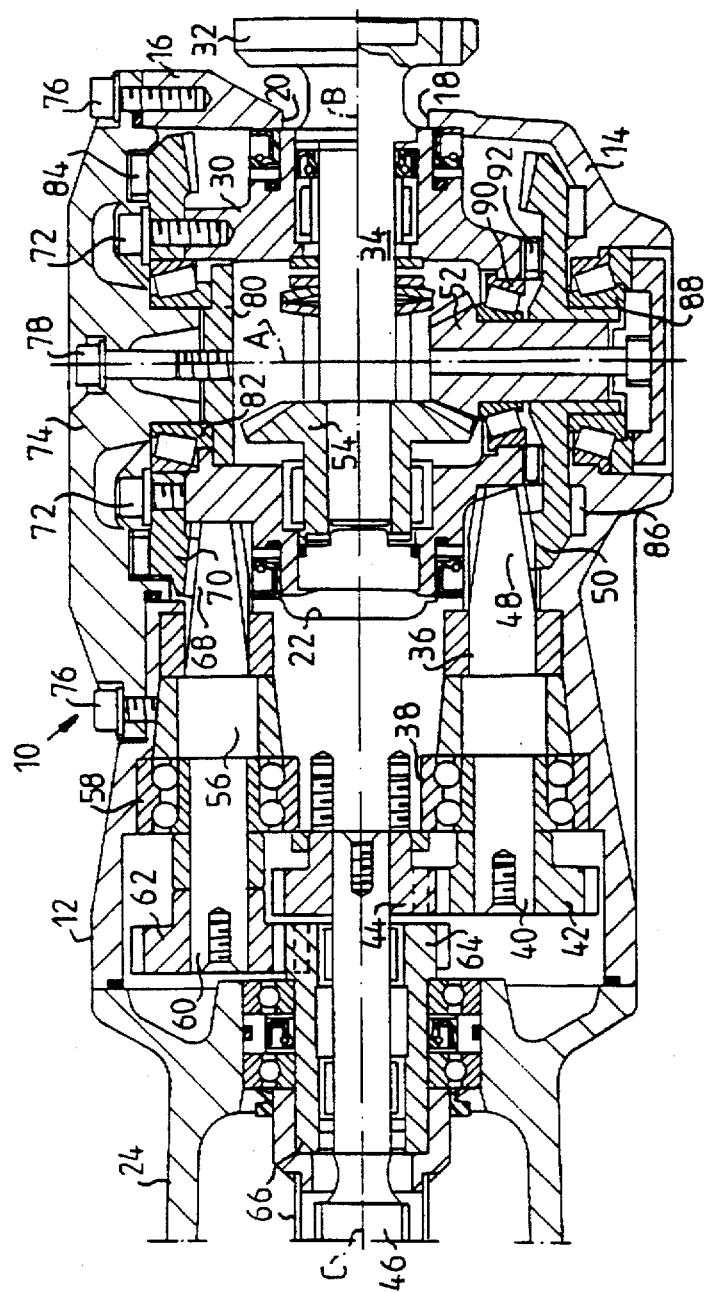

With reference to FIG. 1, there is shown a wrist generally designated 10, for an industrial robot in accordance with the invention. The wrist 10 comprises in principle of a distal, fork-shaped wrist housing 12 with two fork arms 14 and 16, defining between them a groove-shaped space, the side walls 18,20 and bottom wall 22 of which are indicated on FIG. 1.

Figure 2:
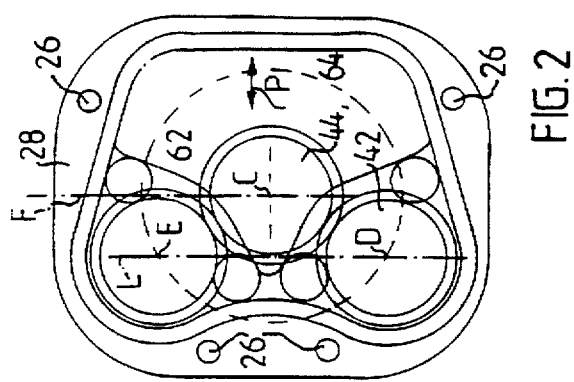

The wrist housing 12 is intended to be mounted on the distal end of a robot arm 24 by means of screw fasteners (not shown). FIG. 2 shows, however, four through-holes 26 for the anchoring screws in an anchoring flange 28 of the housing 12.

In the wrist housing 12 there is a so-called tilt housing 30 pivotally mounted about a transverse axis A and which supports in a manner known per se a turntable 32, which is rotatably mounted about a longitudinally oriented axis B. On the turn-table 32 there can be mounted a chosen tool (not shown), such as a welding unit, gripping means, a spray-painting nozzle or the like. The portion of the tilt housing 30 supporting the turntable 32 and its shaft 34 is thus pivotable about the axis A in the space between the fork arms 14,16 through an arc of less than 360°. The axis A is oriented perpendicular to the rotational axis B of the turntable 32.

For rotation of the turntable 32, there is mounted in the wrist housing 12 a first secondary drive shaft 36 which extends through a hole in the longitudinal direction of the housing 12, preferably parallel to the rotational axis B of the turntable 32. The drive shaft 36, which can be axially and radially mounted in a double-row angular contact ball bearing 38, has an input end 40 on which there is non-rotatably mounted a preferably cylindrical gear 42 which engages a preferably cylindrical driving gear 44 on the end of a first primary drive shaft 46 which is insertable into the wrist housing 12 of the robot arm 24. The other end of the secondary drive shaft 36 is an output end which is in the form of a hypoid pinion 48, which engages a hypoid gear 50, which is rotatably mounted about the axis A perpendicular to the drive shaft 36 and on the outside of the pinion 48. The hypoid pinion 48 and the hypoid gear 50 thus form together a first hypoid gearing. In the hub of the hypoid gear 50 there is non-rotatably mounted a conical drive gear 52, which in turn engages a bevel gear 54 rotatably mounted in the tilt housing 30 and non-rotatably joined to the shaft 34 of the turntable 32.

When the first primary drive shaft 46 in the robot arm 24 is rotated, the rotary movement is thus transmitted via the gearing 44,42 to the secondary drive shaft 36, which in turn, via the first hypoid gearing 48,50 and the angle gearing 52,54 imparts a rotary movement about the axis B to the shaft 34 and thus the turntable 32. The axis B in the neutral position shown in FIG. 1 is coaxial with the center axis C of the primary drive shaft 46. The center axis C is preferably also an axis about which the robot arm 24 itself can rotate.

For pivoting the tilt housing 30 about the axis A in the wrist housing 12, a second secondary drive shaft 56 is also rotatably mounted therein. The second secondary drive shaft 56 extends through a hole in the longitudinal direction of the housing 12, preferably parallel to the firs: secondary drive shaft 36. As is the first secondary drive shaft 36, the second secondary drive shaft 56 is axially and radially mounted in a two-row angular contact ball bearing 58 and has an input end 60 on which there is non-rotatably mounted a preferably cylindrical gear 62, which engages a preferably cylindrical drive gear 64 on the end of a second primary drive shaft 66 in the robot arm 24. The drive gear 64 is disposed coaxial to but axially spaced from the cylindrical drive gear 44 on the first primary drive shaft 46. In the embodiment shown in the drawing the cylindrical drive gears 44,64 and the gears 42,62 have an equal number of teeth, and therefore the gear ratio between the respective primary and secondary drive shafts 46,36 and 66,56 is 1:1. The number of teeth and therefore the gear ratio in these gearings can of course be varied as desired.

The other end of the secondary drive shaft 56 is an output end, which, as is the first secondary drive shaft 36, is in the form of a hypoid pinion 68, which engages a hypoid gear 70 which is rotatably mounted about the axis A perpendicular to the secondary drive shaft 56 and coaxial to the hypoid gear 50 in the first hypoid gearing 48,50. The hypoid gear 50 is located outside the pinion 68. The hypoid gear 70 is securely joined by screws 72 to the tilt housing 30.

As the second primary drive shaft 66, which coaxially encloses the first primary drive shaft 46 in the robot arm 24, rotates, the rotary movement is thus transmitted via the cylindrical gearing 64,62 to the second secondary drive shaft 56, which in turn transmits, via the second hypoid gearing 68,70, the rotation to the tilt housing 30 and the turntable 32 mounted therein about the axis A.

In the wrist housing 12, as can be seen in FIG. 2, the center axes D and E of the secondary drive shafts 36,56 and thus their cylindrical gears 42,62 are located on the same side of a central plane F through the coaxial cylindrical drive gears 44,64 which permit simultaneous adjustment of the gear engagement and thus the clearance between the two cylindrical gearings 44,42 and 64,62 by means of a small radial displacement of the entire wrist housing 12 in the direction of the arrow P in FIG. 2.

The wrist housing 12 is made in one piece, and a sufficiently large opening is made in the upper fork arm 16 in FIG. 1 to permit insertion and installation of the tilt housing 30 and hypoid gears 50,70. This opening is closed after installation by means of a cover 74, which is screwed 76 into the housing 12. A support disc 80 carried by a bolt 78 in the cover 74 holds the upper taper roller bearing 82 in place, the outer race of which centers the hypoid gear 70 and the upper end of the tilt housing 30. A needle thrust bearing 84 in the cover 74 supports the outside of the hypoid gear 70.

The hypoid gear 50 in the first hypoid gearing is supported on its outside by a needle thrust bearing 86 and a taper roller bearing 88 in the lower fork arm 14. A taper roller bearing 90 between the conical drive gear 52 and the tilt housing 30 and a needle thrust bearing 92 on the inside of the hypoid gear insures radial and axial support of the tilt housing 30 in such a manner that reactive forces occurring in the gearing 52,54 during operation will be absorbed in the lower fork arm 14 in such a manner that no force is transmitted to the upper fork arm 16 which strives to force the fork arms 14,16 apart. Thus the housing 12 can be made in lighter and weaker aluminum material without risking a strength and rigidity of the housing. By virtue of the fact that the hypoid gears 50,70 are placed on the outside of the respective pinions 48,68, they can be supported on thrust bearings in the same housing portion as the pinions, thus making it possible to prevent reactive forces from the hypoid gearings from pushing the tilt housing 30 away from either of the fork arms 14,16 of the wrist housing. The tilt housing 30 is thus positively confined within the fork arms, i.e. the arms 14,16 and the tilt housing 30 are held fixed relative to each other in the direction of the axis A by the arrangement described above and shown in FIG. 1 of the hypoid and bevel gearing elements and of the tilt housing.

The use of hypoid gearing makes it possible to make the wrist housing 12 very narrow and compact.

By virtue of the fact that the housing 12 is made in one piece there will be no fitting problems between housing halves when assembling the wrist. It is also simpler to achieve high manufacturing tolerances when machining holes and abutments in the housing since it consists of a single piece. The assembly of i.a. gear trains, bearings, seals etc is also facilitated. And no screws are required for holding the housing halves together, which could otherwise give rise to undesirable movements between the housing halves. Finally, a smaller number of seals are required to prevent dirt from penetrating into the wrist and for preventing any oil in the wrist gearings from leaking out from the housing.

We claim:

1. Industrial robot wrist unit, comprising a wrist housing capable of being fixed to a distal end of a robot arm and which has two fork arms between which a tilt housing is pivotally mounted, said tilt housing supporting a rotatably mounted turntable, first and second drive shafts rotatably mounted in the wrist housing and in each fork arm, said first drive shaft, via a first and a second gearing, respectively being able to rotate the turntable about a first axis and said second drive shaft, via a third gearing being capable of pivoting the tilt housing about a second axis which crosses the first axis wherein the first and third gearings each comprise a hypoid gearing, the hypoid gearing of the first gearing comprising a hypoid pinion disposed on an output of the first drive shaft and a hypoid gear, the hypoid gearing which forms the third gearing comprising a hypoid pinion mounted on the output of the second drive shaft and a hypoid gear having its center axis coaxial to the center axis of the hypoid gear of the first gear, said tilt housing being securely joined to one of the hypoid gears and radially and axially supported relative to the other of said hypoid gears, and the hypoid gears being located on the outside of their respective hypoid pinions for engagement therewith, thereby to positively confine the tilt housing between the fork arms, so that any reactive forces stemming from the first, second and third gearings are prevented from forcing the fork arms apart.

2. Wrist unit according to claim 1, wherein the wrist housing is made in one piece.

3. Wrist unit according to claim 2, wherein the one fork arm has a sealable through-opening, which is coaxial to the pivot axis of the tilt housing and in which the tilt housing and the associated first, second and third gearings can be inserted when assembling the wrist housing.

4. Wrist unit according to claim 3, wherein the through-opening is sealable by a cover which supports thrust and radial bearings for the tilt housing in said one fork arm.

5. Wrist unit according to claim 4, wherein the cover forms an axial support for the hypoid gear of the third gearing.

* * * * *